May 7, 1940.  P. R. LEE  2,199,638
THERMOSTAT
Filed Nov. 12, 1937  2 Sheets-Sheet 1

WITNESSES:
C. J. Weller.
H. C. Hepler.

INVENTOR
Paul R. Lee.
BY
W. R. Coley
ATTORNEY

May 7, 1940.　　　P. R. LEE　　　2,199,638
THERMOSTAT
Filed Nov. 12, 1937　　　2 Sheets-Sheet 2

WITNESSES:
C. J. Weller.
H. G. Hepler.

INVENTOR
Paul R. Lee.
BY W. R. Coley
ATTORNEY

Patented May 7, 1940

2,199,638

UNITED STATES PATENT OFFICE 2,199,638

THERMOSTAT

Paul R. Lee, Mansfield, Ohio, assignor to Westinghouse Electric & Manufacturing Company, East Pittsburgh, Pa., a corporation of Pennsylvania Application November 12, 1937, Serial No. 174,190

10 Claims. (Cl. 200—122)

My invention relates to thermostatic devices and more particularly, to bimetallic thermostats having a radiant heater operatively associated therewith.

An object of my invention is to provide a thermostatic device having narrow temperature diferentials between cooperating parts and a high overload capacity.

A further object of my invention is to provide a thermostatic device constructed in such a manner as to eliminate the possibility of grounds developing between the electrically energized parts thereof and the supporting structure.

A further object of my invention is to provide a rigid, compact and efficient thermostatic device of low cost and organized in such a manner that it may be easily assembled and operatively associated with other devices.

Other objects of my invention will either be pointed out specifically in the course of the following description of devices embodying my invention, or will be apparent from such descriptions.

In the accompanying sheets of drawings.

Figure 1:
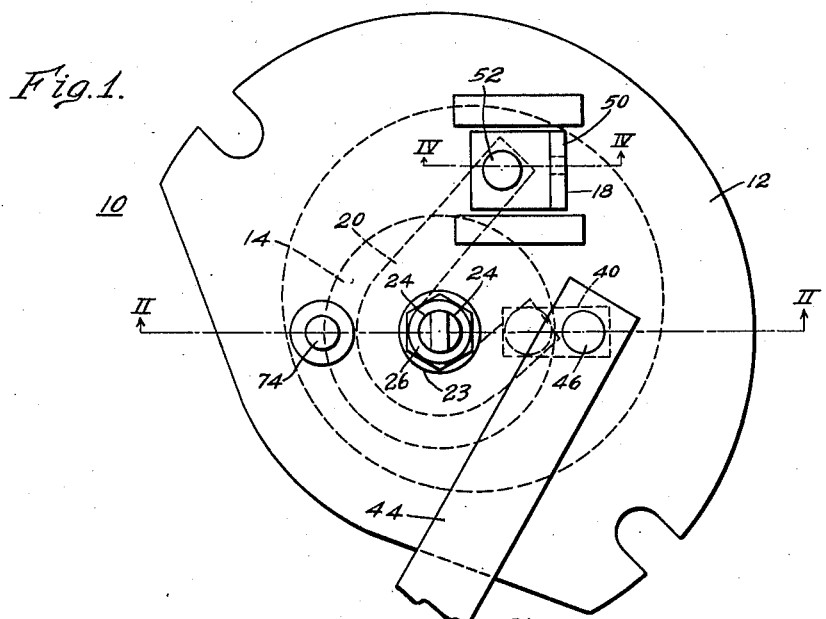
Figure 1 is a top plan view of a device embodying my invention.

Referring to the accompanying drawings, I show a thermostatic device 10 including a support 12, a thermal-responsive preferably bimetallic element or thermostat 14, a circuit-maker-and-breaker 16 operatively associated with the bimetallic member 14 and the supporting device 12, a separate stationary contact terminal 18, and a radiant heater 20 operatively associated with the circuit-maker-and-breaker 16 and the stationary contact terminal 18.

The supporting device or base 12 may be composed of any suitable material. However, it is preferred that such support be composed of an insulating material such as a ceramic or a resinous condensation material. The support 12 may be formed in any shape desired, depending upon the final application and location of the thermostatic device. The supporting base 12, as shown in Figs. 1 to 4, inclusive, comprises a comparatively thin sheet of ceramic material, which eliminates the necessity of using an additional sheet of insulation between the electrical circuits and the supporting base.

An internally threaded metallic bushing 23 is rigidly attached to the central portion of the base 12 in any suitable manner. However, it is preferred that the lip portion 25 of bushing 23 be peened over on a metallic washer 27, which is associated with the base 12. The metallic washer 27 then prevents the base 12 from chipping as the lip 25 is so peened over. A threaded stud bolt 24, which has a shoulder portion 28 at the lower end thereof, is operatively associated with the bushing 23 and is held rigid with respect thereto by means of a nut 26.

The bimetallic thermostat 14, which may be a standard disc-type thermostat well known to the art, is loosely attached to the bottom shoulder portion 28 of the stud bolt 24 by means of screw 30 and washer 32. However, it is to be understood that the thermal-responsive member may be of any other type or shape desired, and may be attached to the base in any desired manner.

A stop-stud 74, rigidly attached to the base 12, has a groove 76 near its outer end that cooperates with the bimetallic disc in such a manner as to restrict its movement as it flexes from one position to another. The main body portion of the stop stud limits the movement of the bimetallic member 14 toward the base 12, ensuring a good positive mating of the circuit-maker-and-breaker 16. The shoulder 75 of stop stud 74 limits the outward movement of the bimetallic member 14. This, in turn, due to the bimetallic disc 14 being mounted loosely at the center, causes such member to be slightly inclined away from the base, ensuring that the circuit-maker-and-breaker 16 will be positively opened or made inoperative.

The circuit-maker-and-breaker 16 comprises a movable contact member 38 and a cooperating stationary contact member 40. The movable contact 38 is attached to the bimetallic disc 14 in any manner desired and the stationary contact 40 is rigidly attached to the support structure 12. The stationary contact 40 is held rigidly against the supporting base 12 by means of a rivet 42 which has a terminal strap 44 operatively associated therewith. The terminal strap 44 is rigidly attached to the rivet 42 between the rivet head 46 and a washer 47.

The movable contact 38 may be loosely mounted upon the bimetallic disc 14 in a manner now well known to the art. However, it is preferred that such contact member be rigidly mounted upon the bimetallic disc 14 by either spot welding or riveting so as to avoid any reduction in contact therebetween. With the movable contact member 38 rigidly attached to the bimetallic disc 14 the top portion thereof should be arched or substantially in the shape of a segment of a sphere. If the contact member be riveted to the bimetallic disc, the top or contact head portion thereof may be the head of the rivet. By having the movable contact member's contact surface substantially spherical in shape, the contact 38 will make a satisfactorily positive engagement with the stationary contact 40 as the bimetallic disc 14 flexes from an open to a closed position.

The stationary contact terminal 18 comprises an angular or bracket-shaped terminal strap 50 rigidly attached to the supporting base 12 by means of a bolt or rivet 52. However, it is to be understood that such second stationary contact terminal 18 may be of any shape or construction desired. The J-shaped radiant heater 20 is rigidly attached at one end to the rivet 52 and through such rivet to the terminal 18 so that there is an electrical connection between the terminal 50 and the radiant heater 20.

The J-shaped radiant heater 20 is rigidly attached at one end to the stationary contact terminal 18 as hereinabove described and at its other end to the movable contact member 38. The radiant heater is attached to the contact member 38, preferably by a direct spot weld in order to insure a permanent electrical connection therewith. A metallic shoulder washer 51 separates the radiant heater from the bimetallic disc 14. It is obvious that one end of the radiant heater will thus move with the bimetallic disc as it moves.

Figure 2:
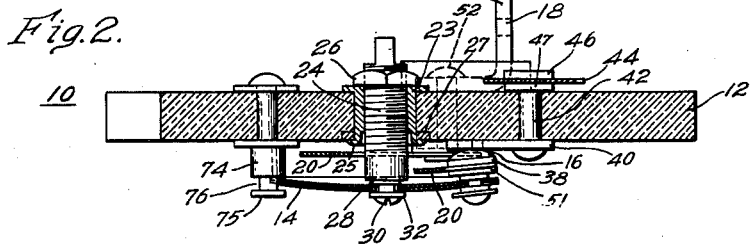
Fig. 2 is a sectional view taken along the line II—II of Fig. 1 with the device in a closed or operative position.
Figure 3:
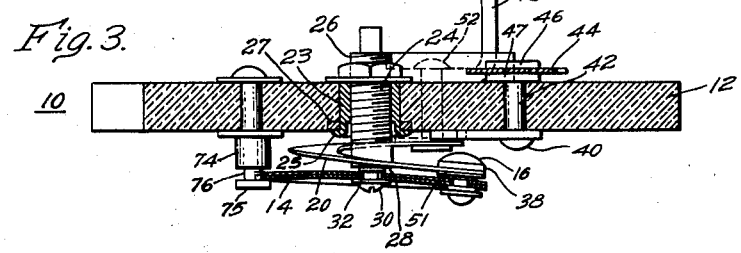
Fig. 3 is a view similar to Fig. 2 with the device in an open or inoperative position.
Figure 4:
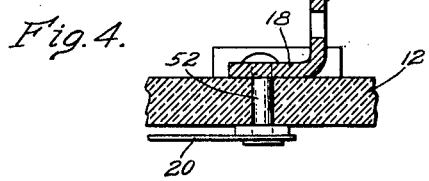
Fig. 4 is a partial sectional view taken along the line IV—IV of Fig. 1.

The radiant heater 20 is composed of a very thin flexible heating material and, as shown in Figs. 1 to 3, inclusive, is in the form of a thin comparatively wide J-shaped ribbon. By having the radiant heater 20 in the form of a thin ribbon element, such heater will have a high overload capacity due to its large surface and contact with the atmosphere. The radiant heater, due to its large surface area and close association with bimetallic disc 14, will have a high efficiency and, therefore, will radiate substantially all of its heat in a short length of time, enabling the thermostatic device 10 and the bimetallic disc 14 to operate quickly, ensuring a narrow temperature differential between the radiant heater and the bimetallic disc.

The radiant heater 20, by reason of being flexible, moves readily with the bimetallic member 14 without retarding its action. To give the radiant heater 20 more effective flexibility, it is preferred that such heater be of considerable length and when such heater is formed of a ribbon, it is preferred that it be looped about the central post 24 forming substantially a J-shaped radiant heater. The radiant heater 20 will then be rigidly attached to the second stationary contact 18 at one end and attached to the movable contact 38 at the other end, effecting an electrical connection between the stationary contact terminal 18 and the movable member 38 of the circuit-maker-and-breaker device 16. This in turn results in a series circuit through the thermostatic device, namely, from stationary contact terminal 18, rivet 52, heater 20, movable contact member 38, stationary contact member 40, rivet 42 to terminal strap 44.

It is to be understood that due to the close association of the radiant heater 20 and the bimetallic disc 14, such radiant heater will affect the temperature of bimetallic disc 14 in accordance with the heat emitted therefrom, which is in proportion to the amount of power passing through the thermostat.

Figure 5:
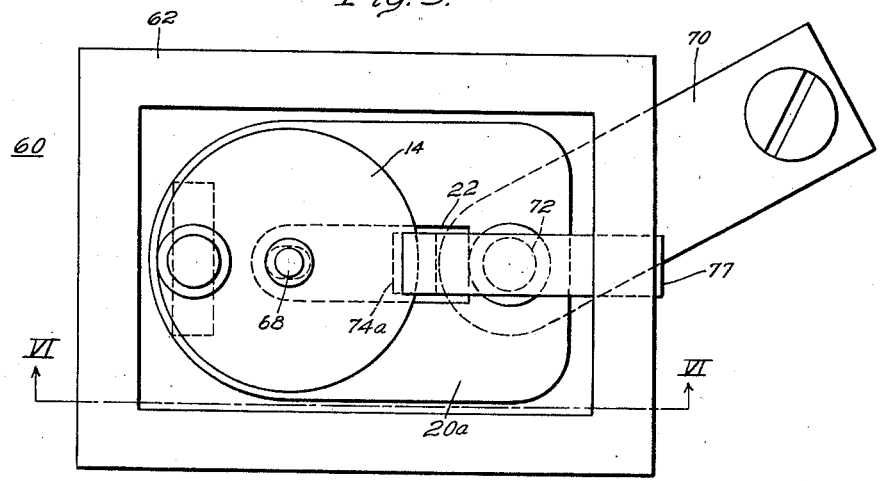
Fig. 5 is a top plan view of a modified form of device embodying my invention.
Figure 6:
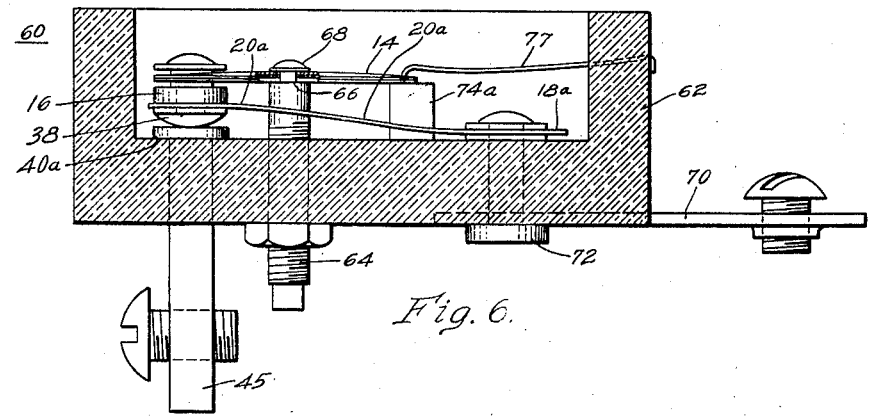
Fig. 6 is a sectional view taken along the line VI—VI of Fig. 5.
Figure 7:
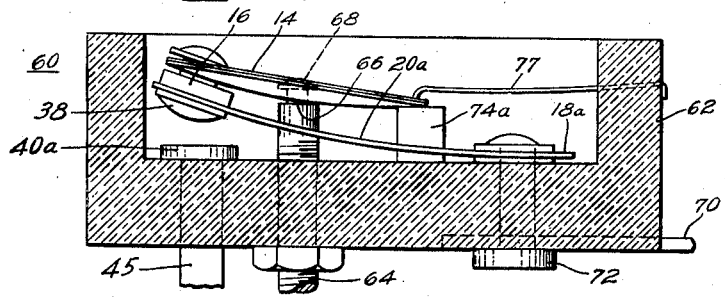
Fig. 7 is a view similar to Fig. 6 with the bimetallic member in an inoperative or open position.

Referring to Figs. 5 to 7, inclusive, I show a modified and preferred form of a thermostatic device 60 embodying my invention. The thermostatic device 60 has operatively associated therewith the bimetallic disc 14, the circuit-maker-and-breaker device 16, stationary contact terminal 18a, and a radiant heater 20a.

The support or casing 62 of the thermostatic device 60 may be composed of any suitable material as is support 12 of the form of my invention shown in the preceding figures.

The bimetallic disc 14 in this modification is movably or loosely attached to the supporting structure 62 by means of a centrally mounted bolt or shaft 64. In this way, the bimetallic disc 14 is permitted to slide a very short distance along the upper end of bolt 64. The downward movement of the bimetallic disc 14 is limited by shoulder 66 of the bolt 64 and its upward movement is limited by the use of the fastening means 68 operatively associated with the upper end of bolt 64.

The circuit-maker-and-breaker 16 is operatively associated with the bimetallic disc 14 in a manner as hereinabove described. However, the stationary contact member 40a thereof is integral with the terminal bolt 45. The stationary contact terminal 18a is likewise similar to the stationary contact terminal 18. However, it is here operatively associated with the terminal strap 70 and radiant heater 20a by means of bolt or rivet 72.

The radiant heater 20a is substantially rectangular in shape as shown in Figs. 5 to 7 inclusive, and is rigidly attached to the stationary contact 18a at one end and to the movable contact 38 of the circuit-maker-and-breaker 16 at its other end. It is, therefore, apparent that the radiant heater 20a is operatively associated with the circuit-maker-and-breaker 16 and the stationary contact terminal 18a so as to effect electrical connection between such circuit-maker-and-breaker and stationary contact. This in turn results in a series circuit similar to that hereinabove described; namely, from stationary terminal strap 70, rivet 72, heater 20a, movable contact member 38, stationary contact member 40a, to terminal bolt 45.

The radiant heater 20a is composed of a material similar to radiant heater 20 so that it will be flexible, permitting the bimetallic disc 14 to flex without retarding such action. An aperture 22 is located within the radiant heater to permit it to be readily mounted within the casing 62 about the bolt 64 and a stop stud 74a.

The radiant heater 20a, being flat and having a large surface, will permit the heat developed therein, due to the power passing therethrough, to radiate directly to the bimetallic or thermal-responsive disc 14, and due to such large surface, the heat radiated will be proportional to the amount of power passing therethrough.

A stop-stud 74a, as shown in Figs. 5 to 7, is rigidly attached to the supporting structure 62 in any manner desired, or may be integral therewith, so that it will limit the movement of the bimetallic disc 14 in one direction. In other words, by having the stop-stud 74a located between the bimetallic disc 14 and the support, the stop-stud will mechanically function substantially like an additional contact device in limiting the movement of the bimetallic disc 14, as such member flexes to a closed or operative position.

By using the stop-studs 74 (Fig. 1) and 74a, it is apparent that the bimetallic disc 14 may function satisfactorily with only one circuit-maker-and-breaker operatively associated therewith.

With the device as shown in Figs. 1 to 3, inclusive, or those thermostatic devices having the radiant heater 20 formed of substantially U-shape, it is apparent that the flexing of the bimetallic disc 14 in each direction will be restricted by the shoulder of groove 76 of stop stud 74. When the bimetallic disc 14 is loosely mounted at the central portion thereof, substantially as shown in Figs. 5 to 7 inclusive, it is likewise restrained in its outward motion as it flexes to an open or inoperative position. In the latter case, however, it is restrained by a resilient member 77 which is rigidly attached to the supporting structure 62 at one end and operatively associated with the bimetallic disc 14, substantially in line with the stop stud 74a. With the resilient member 77 operatively associated with the bimetallic disc 14 in line with the stop stud 74a, it is apparent that as the bimetallic disc 14 flexes to an open position, such member will move longitudinally along the central axis or bolt 64, about a pivotal line near the contact area of disc 14 and spring 77, effecting a relatively wide separation of the circuit-maker-and-breaker contacts 38 and 40a, substantially as shown in Fig. 7.

It will, therefore, be seen that by using a resilient or flexible radiant heater operatively associated at one end with the movable member of the circuit-maker-and-breaker device and at the other end to a stationary contact terminal, as illustrated, such radiant heater will be so electrically associated with the circuit-maker-and-breaker and the stationary terminal as to be heated when the thermostatic device is in the closed position and to cool when the device is in an operative position. Accordingly, it is apparent that the flexible radiant heater will control the operation of the bimetallic disc of the thermostatic device in proportion to the amount of the current or load passing through the thermostatic device.

It will further be seen that by having the radiant heater with a large surface either in the form of a ribbon or of a sheet, such radiant heater will influence the operation of the thermostatic device in accordance with a narrow temperature differential and permit the thermostatic device to have a high overload capacity.

It will still further be seen that with the use of a supporting structure or base composed of an insulating material, it will be unnecessary to insulate the various electrical parts from such base and that, therefore, such structure will prevent the grounding of the thermostatic device.

Various further modifications may be made in the device embodying my invention without departing from the spirit and scope thereof, and I desire, therefore, that only such limitations shall be placed thereon as are imposed by the prior art and the appended claims.

I claim as my invention:

1. A thermostatic device including a bimetallic element, a circuit-maker-and-breaker comprising a movable contact member mounted upon said bimetallic element, a stationary terminal, a radiant heater connected at one end to the movable contact of said circuit-maker-and-breaker and at the other end to the stationary terminal, a stop stud, and means comprising said stud for limiting the movement of said bimetallic element.

2. A thermostatic device including a support, a bimetallic element, a circuit-maker-and-breaker comprising a stationary and a movable contact member, said movable contact member mounted upon said bimetallic element, a stationary terminal, a stop-stud attached to said support, a radiant heater connected at one end to the movable contact member and at the other end to the stationary terminal, and means comprising said stud for limiting the movement of said bimetallic element.

3. A thermostatic device including a support, a bimetallic element, a circuit-maker-and-breaker including a movable contact member mounted on said bimetallic element, a stationary contact attached to said support, and a substantially J-shaped radiant heater connected at one end to the movable contact and at the other end to the stationary terminal for affecting a flexible electrical connection between the movable contact and stationary terminal.

4. A thermostatic device including a support, a bimetallic element, a circuit-maker-and-breaker including a movable contact member mounted on said bimetallic element, a stationary terminal attached to said support, a substantially J-shaped radiant heater connected at one end to the movable contact and at the other end to the stationary terminal for effecting a flexible electrical connection between the movable contact and stationary terminal, and means including said radiant heater for effecting operation of said bimetallic element.

5. A thermostatic device including a support, a bimetallic element, a circuit-maker-and-breaker including a movable contact member mounted on said bimetallic element, a stationary terminal attached to said support, and a substantially rectangularly-shaped radiant heater connected at one end to the movable contact and at the other end to the stationary terminal for effecting a flexible electrical connection between the movable contact and stationary terminal.

6. A thermostatic device including a support, a bimetallic element, a circuit-maker-and-breaker including a movable contact member mounted on said bimetallic element, a stationary terminal attached to said support, a substantially rectangularly-shaped radiant heater connected at one end to the movable contact and at the other end to the stationary terminal for affecting a flexible electrical connection between the movable contact and stationary terminal, and means including said radiant heater for effecting operation of said bimetallic element.

7. A thermostatic device including a support, a bimetallic element, a circuit-maker-and-breaker including a movable contact member mounted on said bimetallic element, a stationary contact attached to said support, a stop-stud and a resilient member attached to said support, means comprising said stop-stud and resilient member for limiting the movement of said bimetallic element, and a substantially rectangularly-shaped radiant heater connected at one end to the movable contact and at the other end to the stationary contact for effecting a flexible electrical connection between the movable and stationary contacts.

8. A thermostatic device including a support, a bimetallic element, a circuit-maker-and-breaker including a movable contact member mounted on said bimetallic element, a stationary contact attached to said support, a stop-stud and a resilient member attached to said support, means comprising said stop-stud and resilient member for limiting the movement of said bimetallic element, a substantially rectangularly-shaped radiant heater connected at one end to the movable contact and at the other end to the stationary contact for effecting a flexible electrical connection between the movable and stationary contacts, and means including said radiant heater for effecting operation of said bimetallic member.

9. A thermostatic device including a support, a thermal-responsive element having a mounting member secured to said support, a circuit-maker-and-breaker including a movable contact member mounted on said element, a stationary terminal attached to said support, and a radiant heater having as its only means of support a connection at one point to said element and at another point to said terminal, the portion of said heater between said points being looped around said mounting member.

10. A thermostatic device including a support, a bimetallic disk having a central mounting member secured to said support, a circuit-maker-and-breaker including a movable contact member mounted on said disk, a stationary terminal attached to said support, and a radiant heater having as its only means of support a connection at one point to said disk and at another point to said terminal, the portion of said heater between said points being looped around said mounting member.

PAUL R. LEE.